(12) United States Patent
Kim et al.

(10) Patent No.: US 10,355,763 B2
(45) Date of Patent: Jul. 16, 2019

(54) METHOD FOR ESTIMATING CHANNEL AND DEVICE THEREFOR

(71) Applicant: LG ELECTRONICS INC., Seoul (KR)

(72) Inventors: Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 15/313,466

(22) PCT Filed: Jul. 30, 2015

(86) PCT No.: PCT/KR2015/007996
§ 371 (c)(1),
(2) Date: Nov. 22, 2016

(87) PCT Pub. No.: WO2016/018101
PCT Pub. Date: Feb. 4, 2016

(65) Prior Publication Data
US 2017/0201307 A1     Jul. 13, 2017

Related U.S. Application Data

(60) Provisional application No. 62/031,826, filed on Jul. 31, 2014.

(51) Int. Cl.
*H04B 7/04*     (2017.01)
*H04B 7/06*     (2006.01)
(Continued)

(52) U.S. Cl.
CPC ............. *H04B 7/0626* (2013.01); *H04B 7/04* (2013.01); *H04B 7/0456* (2013.01);
(Continued)

(58) Field of Classification Search
CPC .... H04B 7/0456; H04B 7/0626; H04L 5/0048
See application file for complete search history.

(56) References Cited

U.S. PATENT DOCUMENTS

2013/0258964 A1    10/2013   Nam et al.
2013/0258965 A1    10/2013   Geirhofer et al.
(Continued)

*Primary Examiner* — Andrew Lai
*Assistant Examiner* — M Mostazir Rahman
(74) *Attorney, Agent, or Firm* — Birch, Stewart, Kolasch & Birch, LLP

(57) ABSTRACT

A method for reporting a channel state of a downlink channel transmitted through two-dimensionally arranged $N_t$ number of antenna ports, according to one embodiment of the present disclosure, is performed by a terminal, and the method comprises the steps of: receiving a reference signal (RS) configuration for measuring a channel for the two-dimensionally arranged $N_t$ number of antenna ports, wherein the RS is code division multiplexed (CDM) and is transmitted through the $N_t$ number of antenna ports; and receiving the RS by using the received RS configuration, and calculating channel state information on a downlink channel so as to report the channel state information to a serving cell, wherein the reported channel state information includes a precoding matrix for the transmission of the RS, and the precoding matrix for the transmission of the RS can be subset of a codebook for a precoding matrix for the data transmission of the $N_t$ number of antenna ports.

6 Claims, 15 Drawing Sheets

(51) Int. Cl.
*H04B 7/0456* (2017.01)
*H04L 5/00* (2006.01)

(52) U.S. Cl.
CPC ............ *H04B 7/0478* (2013.01); *H04B 7/06* (2013.01); *H04B 7/0639* (2013.01); *H04L 5/0048* (2013.01); *H04L 5/0057* (2013.01); *H04L 5/0016* (2013.01); *H04L 5/0023* (2013.01)

(56) References Cited

U.S. PATENT DOCUMENTS

| | | |
|---|---|---|
| 2013/0272151 A1 | 10/2013 | Thomas et al. |
| 2014/0016549 A1 | 1/2014 | Novlan et al. |
| 2014/0098689 A1 | 4/2014 | Lee et al. |
| 2015/0341100 A1* | 11/2015 | Kwak ................ H04B 7/0626 370/329 |

* cited by examiner

FIG. 6

METHOD FOR ESTIMATING CHANNEL AND DEVICE THEREFOR

CROSS REFERENCE TO RELATED APPLICATIONS

This application is the National Phase of PCT International Application No. PCT/KR2015/007996, filed on Jul. 30, 2015, which claims priority under 35 U.S.C. 119(e) to U.S. Provisional Application No. 62/031,826, filed on Jul. 31, 2014, all of which are hereby expressly incorporated by reference into the present application.

TECHNICAL FIELD

The present invention relates to a wireless communication system, and more particularly to a method and apparatus for reporting a channel state through channel estimation based on some antenna ports.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

An object of the present invention is to provide a method for reporting a channel state, and a signaling method associated with a more efficient channel state report.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for reporting, by a terminal, a channel state for a downlink channel transmitted through $N_t$ antenna ports arranged in a two dimensional (2D) shape including: receiving a reference signal (RS) configuration for channel measurement of the $N_t$ antenna ports arranged in the 2D shape, wherein the RS is code division multiplexed and then transmitted through the $N_t$ antenna ports; and calculating channel state information (CSI) of a downlink channel upon receiving the RS using the received RS configuration, and reporting the calculated CSI to a serving cell, wherein the reported CSI includes a precoding matrix for transmission of the RS, and the precoding matrix for transmission of the RS may be a subset of a codebook for a precoding matrix for data transmission of the $N_t$ antenna ports.

Additionally or alternatively, the $N_t$ antenna ports may be comprised of a vertical antenna group or a horizontal antenna group.

Additionally or alternatively, the codebook for the precoding matrix for data transmission of the $N_t$ antenna ports may be represented by a Kronecker product of a precoding matrix of a vertical antenna group and a procoding matrix of a horizontal antenna group of the $N_t$ antenna ports.

Additionally or alternatively, if time variance of the downlink channel is lower than a predefined value, all codebooks for the precoding matrix for data transmission of the $N_t$ antenna ports may be used as a candidate matrix for reporting the channel state. If time variance of the downlink channel is equal to or higher than the predefined value, the precoding matrix for transmission of the RS may be used as a candidate matrix for reporting the channel state.

In another aspect of the present invention, a terminal for reporting a channel state for a downlink channel transmitted through $N_t$ antenna ports arranged in a two dimensional (2D) shape includes a radio frequency (RF) unit and a processor configured to control the RF unit. The processor is further configured to: receive a reference signal (RS) configuration for channel measurement of the $N_t$ antenna ports arranged in the 2D shape, wherein the RS is code division multiplexed and then transmitted through the $N_t$ antenna ports, calculate channel state information (CSI) of a downlink channel upon receiving the RS using the received RS configuration, and report the calculated CSI to a serving cell, wherein the reported CSI includes a precoding matrix for transmission of the RS, and the precoding matrix for transmission of the RS is a subset of a codebook for a precoding matrix for data transmission of the $N_t$ antenna ports.

Additionally or alternatively, the $N_t$ antenna ports may be comprised of a vertical antenna group or a horizontal antenna group.

Additionally or alternatively, the codebook for the precoding matrix for data transmission of the $N_t$ antenna ports may be represented by a Kronecker product of a precoding matrix of a vertical antenna group and a procoding matrix of a horizontal antenna group of the $N_t$ antenna ports.

Additionally or alternatively, if time variance of the downlink channel is lower than a predefined value, the processor may consider all codebooks for the precoding matrix for data transmission of the $N_t$ antenna ports to be a candidate matrix for reporting the channel state; or if time variance of the downlink channel is equal to or higher than the predefined value, the processor may consider the precoding matrix for transmission of the RS to be a candidate matrix for reporting the channel state.

It is to be understood that both the foregoing general description and the following detailed description of the present invention are exemplary and explanatory and are intended to provide further explanation of the invention as claimed.

Advantageous Effects

As is apparent from the above description, the embodiments of the present invention can report channel state information (CSI) through channel estimation based on some antenna ports, such that efficiency of the antenna port configuration for channel state report can be achieved and the channel state information (CSI) can be efficiently reported.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a conceptual diagram illustrating a transmittable pattern of CSI-RS having 8 antenna ports in a resource block (RB) composed of 12 subcarriers in the LTE-A system.

BEST MODE

Figure 1:
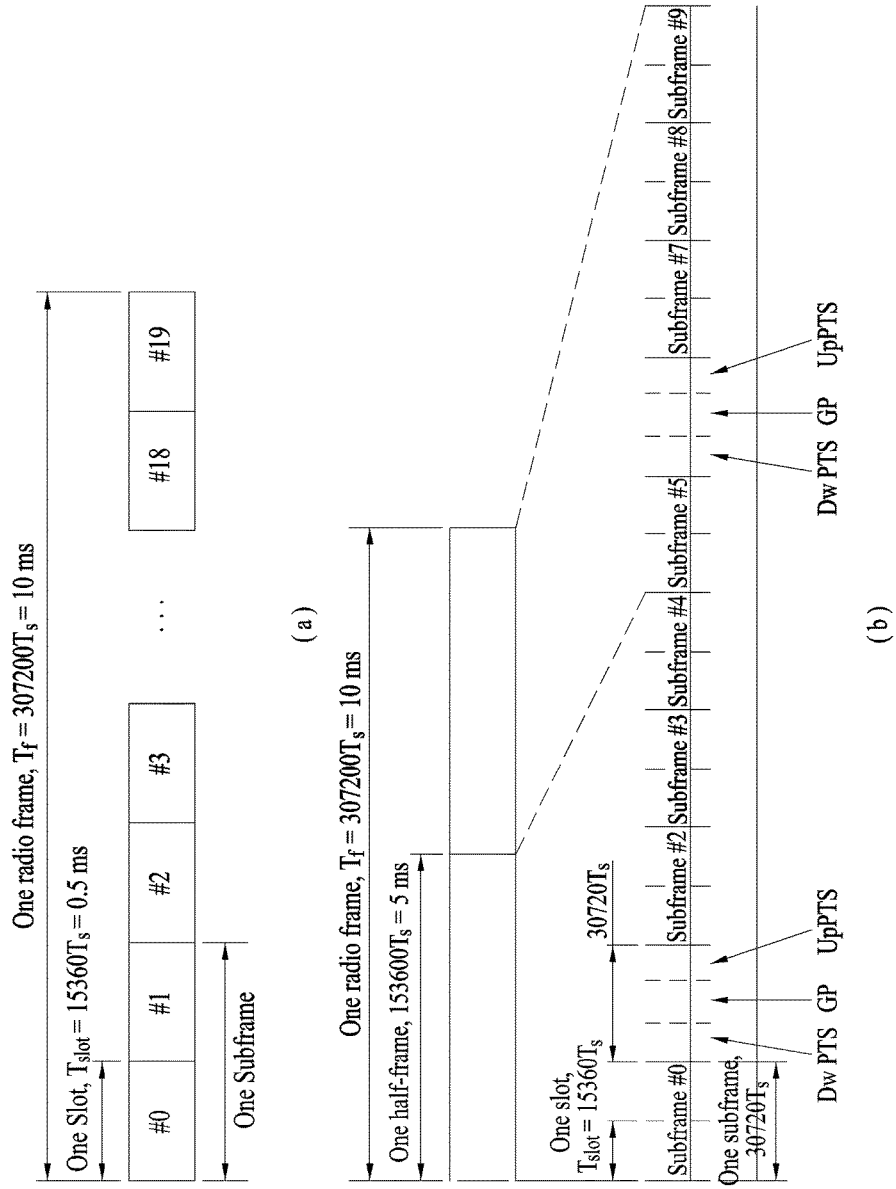
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
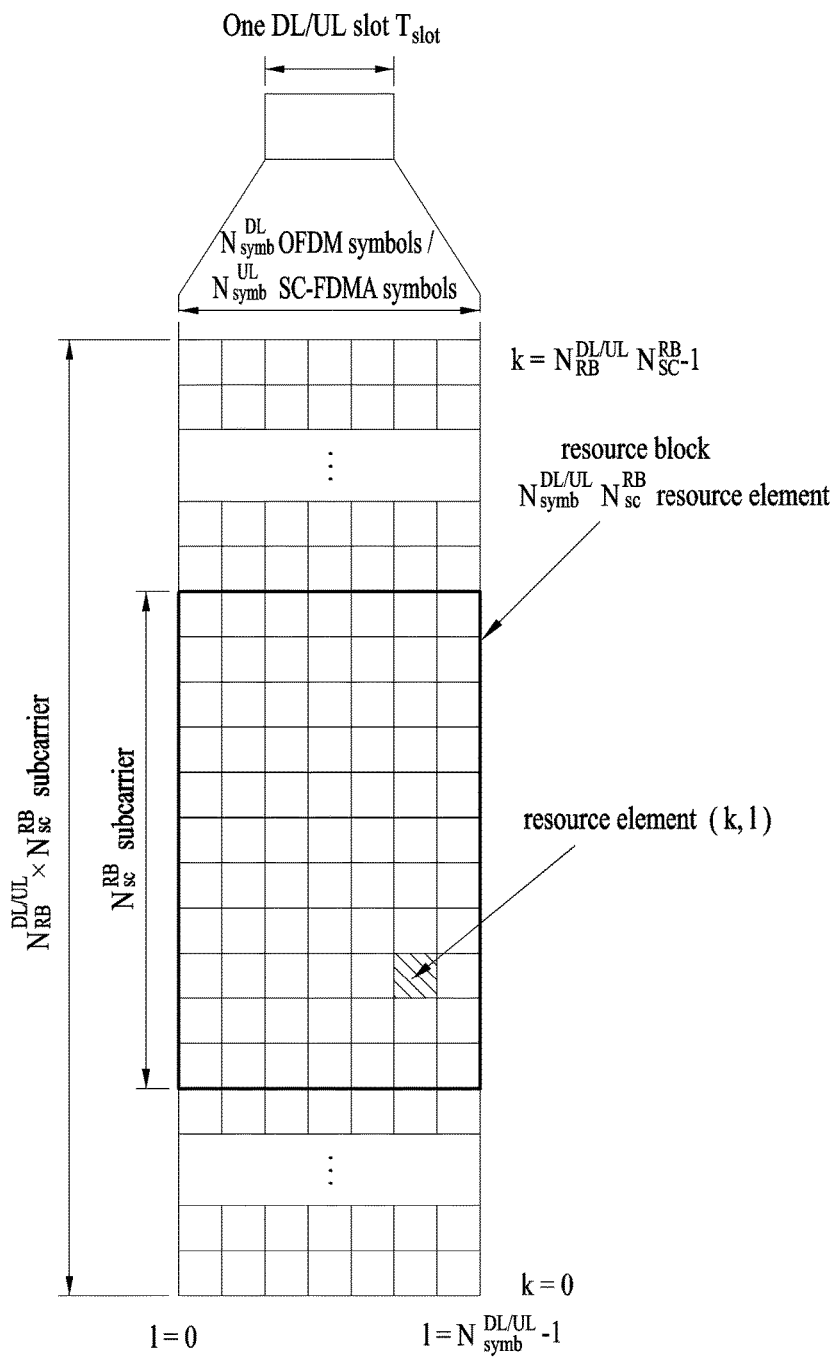
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $B_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
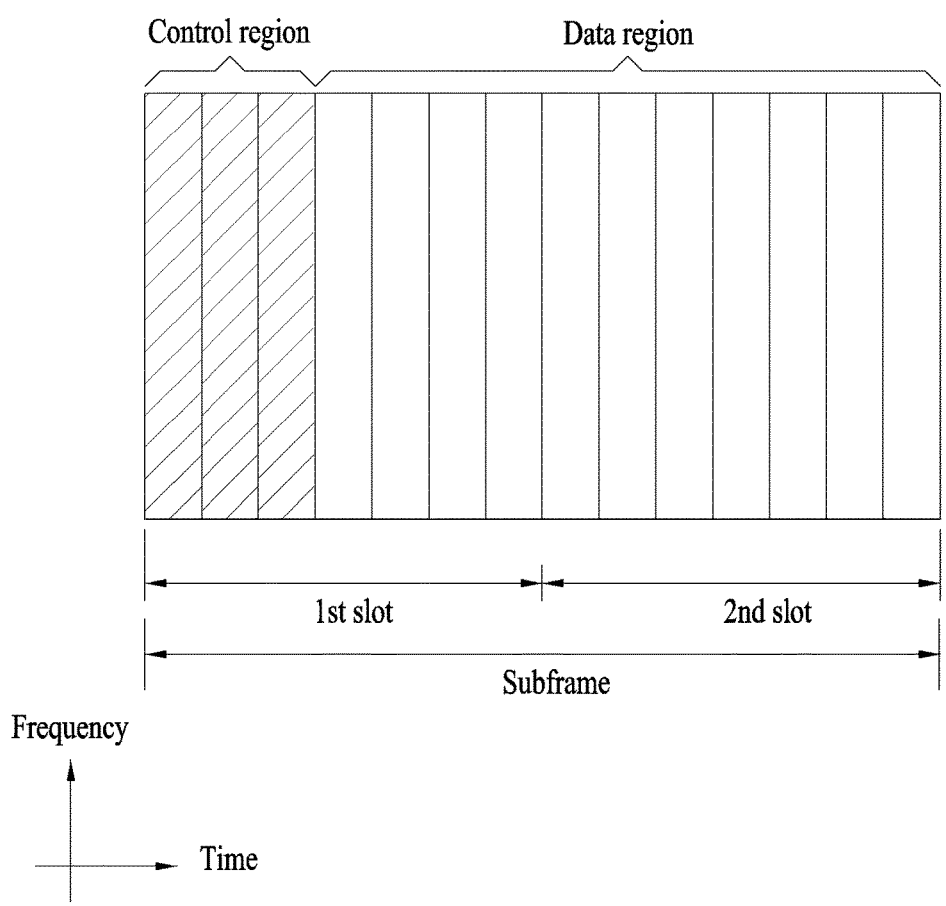
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared channel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
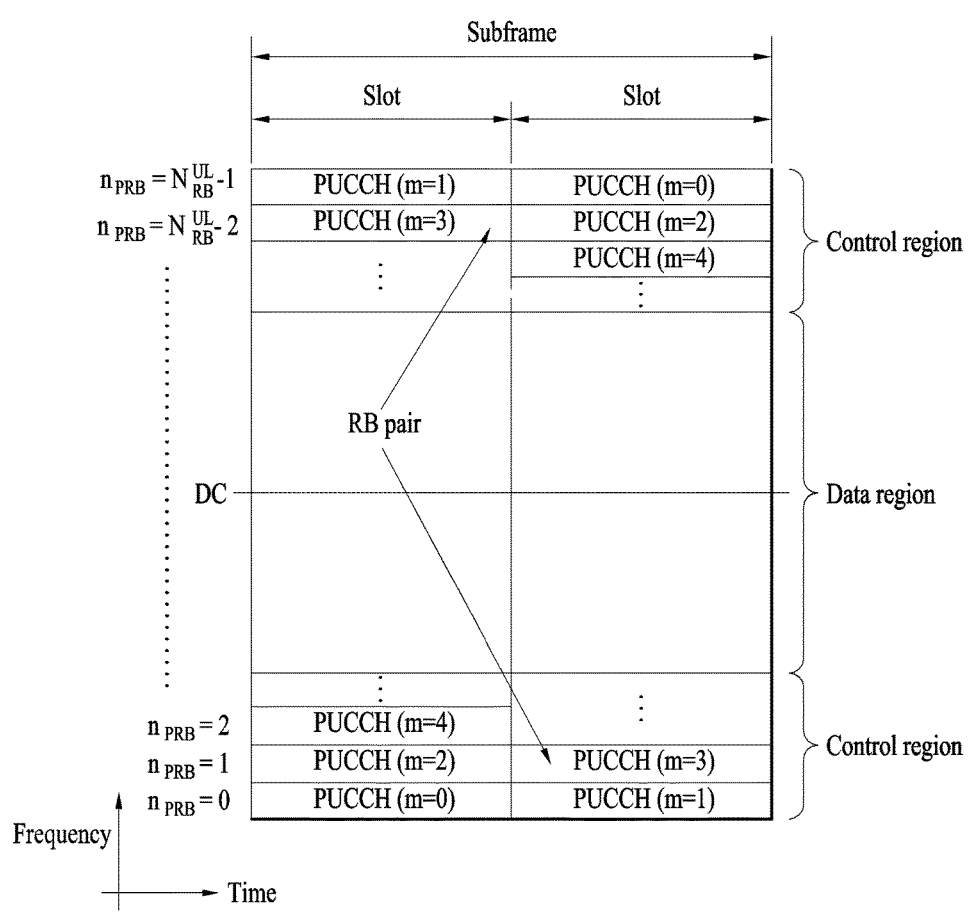
FIG. 4 exemplarily shows an uplink (UL) subframe for use in a 3GPP LTE/LTE-A system.
Figure 5:
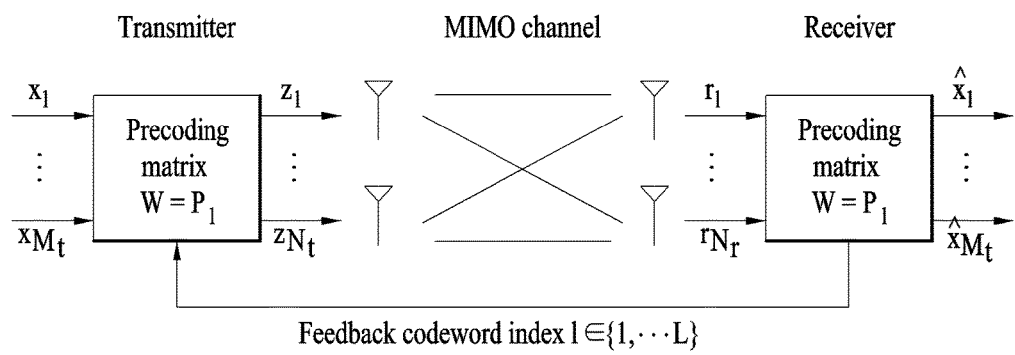
FIG. 5 is a conceptual diagram illustrating codebook based beamforming.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMFRI and PUCCH format 3 is used to transmit ACK/NACK information.

Codebook-Based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
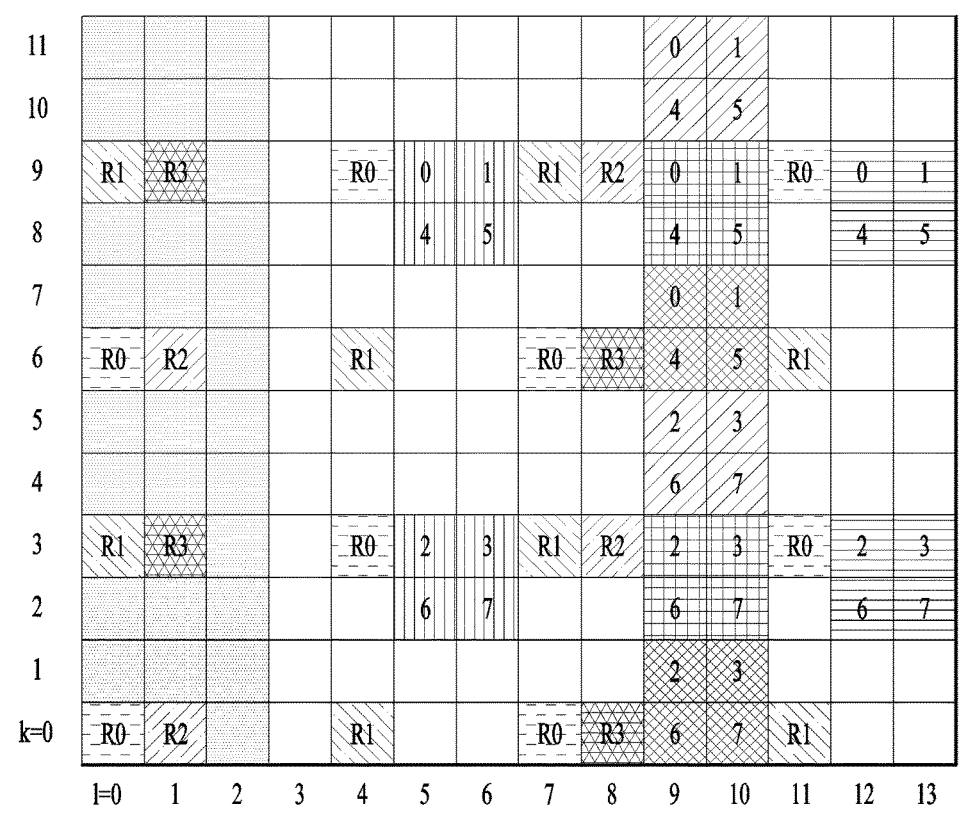

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |

TABLE 6-continued

| Codebook index | $u_n$ | Number of layers v | | | |
|---|---|---|---|---|---|
| | | 1 | 2 | 3 | 4 |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/2]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/2]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/2]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/2]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left(\pm 1, \pm j, \pm \frac{(1+j)}{\sqrt{2}}, \pm \frac{(-1+j)}{\sqrt{2}}\right)$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

As described above, two downlink RSs (i.e., a cell-specific RS (CRS) and a UE-specific RS) have been defined for a unicast service in the LTE system. UE-specific RS may be used only for data demodulation, and CRS may be used not only for data demodulation but also for RRM measurement (such as CSI acquisition or handover). CRS may be transmitted to the entire system band every subframe, and RS for a maximum of 4 antenna ports may be transmitted according to the number of transmit (Tx) antennas of a base station (BS). For example, assuming that the BS includes two Tx antennas, CRSs for antenna ports #0 and #1 may be transmitted. Assuming that the BS includes four Tx antennas, CRSs for antenna ports (#0~#3) may be respectively transmitted.

The LTE-A system may support a maximum of 8 Tx antennas through downlink of the BS. If the LTE-A system transmits a reference signal (RS) for a maximum of 8 Tx antennas to the entire band at each subframe according to the same scheme as in CRS of the legacy LTE, RS overhead may excessively increase. Therefore, RS for use in LTE-A may be classified into a CSI-RS for CSI measurement for selecting MCS, PMI, etc. and a DM-RS for data demodulation in such a manner that two RSs may be added. Although CSI-RS can be used for RRM measurement, the CSI-RS has been designed for CSI acquisition. CSI-RS is not used for data demodulation, such that the CSI-RS need not be transmitted at each subframe. Therefore, CSI-RS may be intermittently transmitted on a time axis so as to reduce CSI-RS overhead. For data demodulation, DM-RS may be dedicatedly transmitted to the UE scheduled in the corresponding time-frequency domain. That is, DM-RS of a specific UE may be transmitted only to the region (i.e., the time-frequency domain for receiving data) in which the corresponding UE is scheduled.

FIG. 6 is a conceptual diagram illustrating a transmittable pattern of CSI-RS having 8 antenna ports in a resource block (RB) composed of 12 subcarriers in the LTE-A system. RS for only one antenna port is spread throughout two OFDM symbols, and two RSs may share two REs and may be identified by the orthogonal codes. For example, RS denoted by numbers 0 and 1 may indicate two REs to which CSI-RS ports #0 and #1 are transmitted. For convenience of description and better understanding of the present invention, CSI-RS port #0 or #1 may be used. In order to discriminate between other kinds of RSs (e.g., CRS or UE-specific RS), CSI-RS port #0 or #1 may have an index #15 or #16. CSI-RS may include not only port #8 but also other ports (#1, #2, #4).

Figure 7:
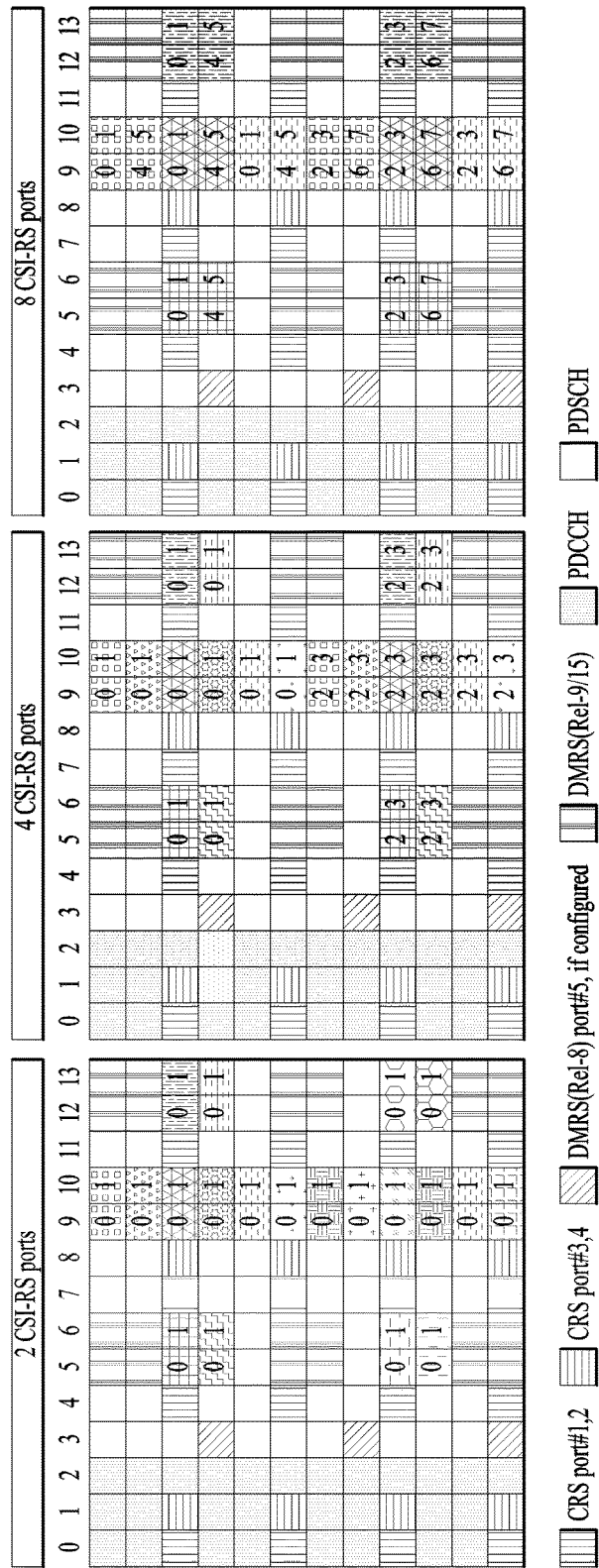
FIG. 7 is a conceptual diagram illustrating 2-port, 4-port, and 8-port CSI-RS transmission patterns.

In a method for transmitting a normal CP as shown in Table 7, the positions of Tx REs of the N-port CSI-RS may be denoted by a subcarrier index (k), an OFDM symbol index (l), and a slot index ($n_s$). As can be seen from Table 7, 8-port CSI-RS commonly applied to the frame structure type (FDD mode) and the Type 2 (TDD mode) of the LTE system may have only 5 Tx patterns in only one subframe. FIG. 7 shows 2-port, 4-port, and 8-port CSI-RS transmission patterns.

TABLE 7

| CSI-RS config- | Number of CSI-RSs configured | | | | | |
|---|---|---|---|---|---|---|
| | 1 or 2 | | 4 | | 8 | |
| uration | (k', l') | $n_{smod2}$ | (k', l') | nsmod2 | (k', l') | nsmod2 |
| FS-1 and FS-2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |

TABLE 7-continued

| CSI-RS config- | Number of CSI-RSs configured | | | | | |
|---|---|---|---|---|---|---|
| | 1 or 2 | | 4 | | 8 | |
| uration | (k', l') | $n_{smod2}$ | (k', l') | nsmod2 | (k', l') | nsmod2 |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

CSI-RS configuration for use in the current LTE standard is composed of antennaPortsCount, subframeConfig, resourceConfig, etc., such that the CSI-RS configuration may indicate how many antenna ports are used for CSI-RS transmission, may indicate the period and offset of the subframe to which CSI-RS will be transmitted, and may indicate which RE position (frequency and OFDM symbol index) within the corresponding subframe is used for CSI-RS transmission. In more detail, the BS may transmit the following information when transmitting specific CSI-RS configuration to the UE.

antennaPortsCount: This is a parameter (e.g., 1 CSI-RS port, 2 CSI-RS ports, 4 CSI-RS ports, or 8 CSI-RS ports) for indicating the number of antenna ports used for CSI-RS transmission.

resourceConfig: This is a parameter indicating the position of CSI-RS allocation resource.

subframeConfig: This is a parameter indicating a subframe period and an offset to be used for CSI RS transmission.

p-C: This is a parameter for UE assumption for a reference PDSCH transmit (Tx) power for CSI feedback CSI-RS. Pc is the ratio of CSI-RS EPRE to PDSCH EPRE (energy per resource element) when a user equipment (UE) has [−8, 15] dB values as the 1 dB step during calculation of the CSI feedback.

zeroTxPowerResourceConfigList: This is a parameter for zero-power CSI-RS configuration.

zeroTxPowerSubframeConfig: This is a parameter for the subframe period and offset to be used for transmission of a zero power CSI-RS.

Introduction of the active antenna system (AAS) is considered in the evolved wireless communication systems. The AAS refers to a system in which each antenna includes an active element such as an amplifier, differently from a conventional passive antenna system in which the amplifier capable of adjusting the phase and magnitude of a signal is separated from the antenna. The AAS is efficient in terms of energy and operation cost since the AAS uses active antennas and thus does not require an additional cable, connector, hardware and the like to connect the amplifier to antennas. In addition, since the AAS supports electronic beam control for each antenna, the AAS enables enhanced MIMO technology such as formation of an accurate beam pattern in consideration of a beam direction and a beam width or formation of a three-dimensional (3D) beam pattern.

Figure 8:
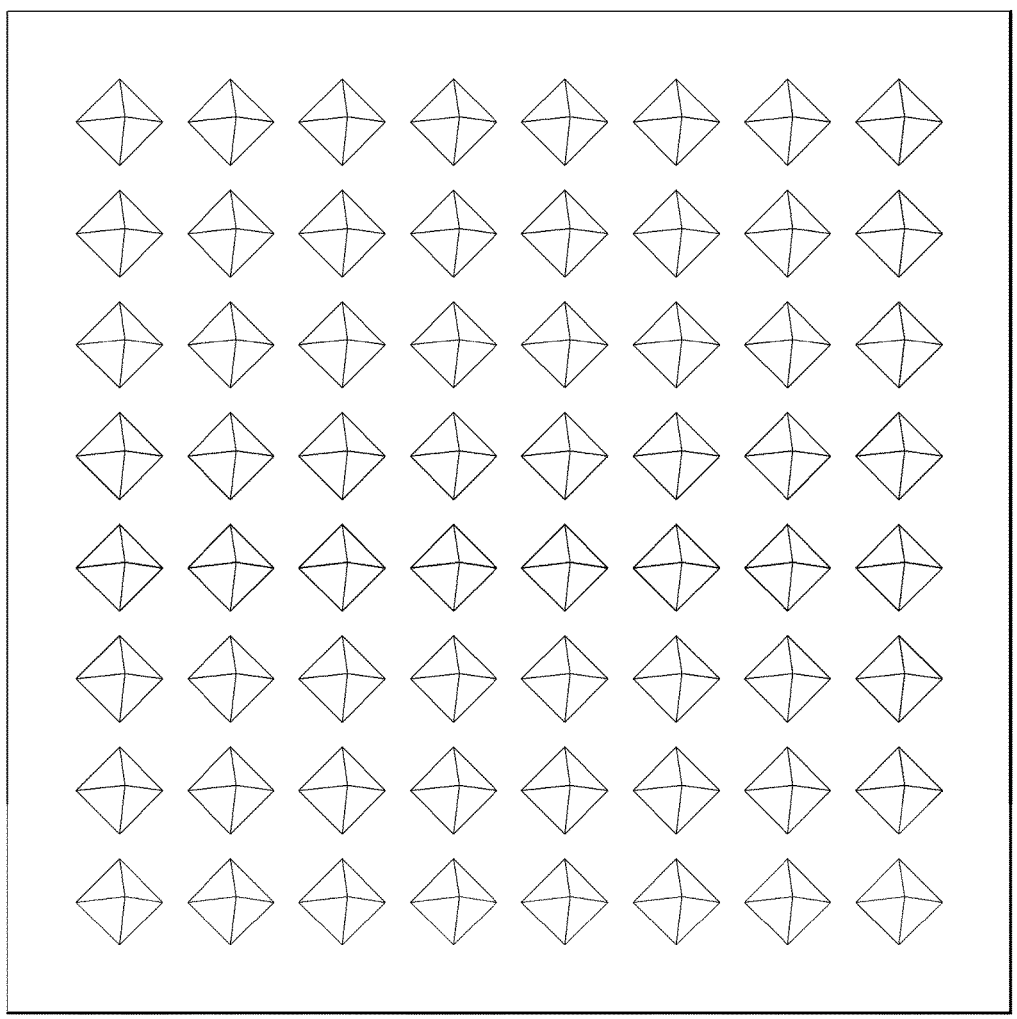
FIG. 8 is a conceptual diagram illustrating a two-dimensional (2D) antenna array.

With the introduction of an enhanced antenna system such as the AAS, a large-scale MIMO system having a plurality of input/output (I/O) antennas and a multi-dimensional antenna structure is considered. For example, when a two-dimensional (2D) antenna array instead of a conventional linear antenna array is formed, a three-dimensional (3D) beam pattern can be generated according to active antennas of the AAS. $N_t$ (i.e., $N_t=N_v \cdot N_h$) antennas may have a square shape as a general 2D antenna array as shown in FIG. 8. $N_h$ is the number of antenna columns, and $N_v$ is the number of antenna rows.

Figure 9:
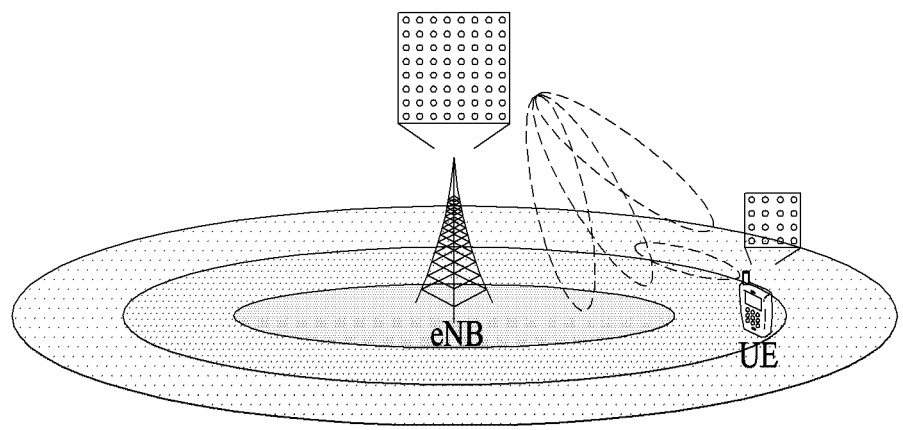
FIG. 9 is a conceptual diagram illustrating a 3D beampattern based on the 2D antenna array.

When using the 3D beam pattern in terms of Tx antenna, semi-static or dynamic beam may be formed not only in the horizontal direction of the beam, but also in the vertical direction of the beam. For example, application of the vertical directional sector formation may be considered. In addition, when the receive (Rx) beam is formed using large-scale antennas in terms of the Rx antenna, signal power may increase according to the antenna array gain. On uplink, the BS may receive signals from the UE through the plurality of antennas. In this case, the UE may have a very low Tx power in consideration of large-scale Rx antennas so as to reduce influence of interference. FIG. 9 is a conceptual diagram of the above-mentioned example, and is a conceptual diagram illustrating the system including a plurality of Tx/Rx antennas through which the BS or UE can form the AAS-based 3D beam.

In accordance with the present invention, vectors generated by a linear combination of RS precoding vectors decided by an orthogonal sequence multiplied by RSs which are CDM-processed and transmitted when RSs of several antenna ports are transmitted according to the FDM (frequency division multiplexing)+CDM (code division multiplexing) scheme, can be contained in a codebook for the precoding matrix used in data transmission or CSI report. In addition, the present invention may provide a method for maximizing the ratio of the data precoding matrices contained in the codebook represented by a linear combination of the RS precoding vectors. According to the above-mentioned scheme, if a target channel has low time-variant characteristics, a user equipment (UE) may consider all the precoding matrices contained in the codebook to be candidate matrices to be used for CSI reporting. If the channel has high time-variant characteristics, the UE may consider some precoding matrices to be candidate matrices to be used for CSI reporting Assuming that the number of BS antennas is $N_t$ and the maximum Tx power of the BS transmitter is set to $P_t$[Watt], the maximum Tx power capability for each antenna may be denoted by $P_a=P_t/N_t$ that is considered most efficient in terms of the size and cost of the antenna amplifier. In this case, the amplifier per antenna is comprised of an independent element, such that Tx power exchange between the antenna amplifiers may be impossible. In other words, Tx power capability for each antenna must be fully consumed so that signals can be transmitted at a maximum Tx power of the BS transmitter.

In the OFDM transmission scheme, a specific subcarrier of the Tx OFDM symbol of each antenna port will hereinafter be referred to as a resource element (RE), and RE of the k-th subcarrier of the n-th OFDM symbol of the n-th antenna port is denoted by RE(k,l,n). Average energy to be transmitted for each RE of each antenna port will hereinafter be referred to as energy per resource element (EPRE). In the method for transmitting an OFDM composed of K subcarriers each having a transmission time (T), the entire average transmission energy obtained by the energy sum of all antennas for each RE may be denoted by $E_t=T \cdot P_t/K$. The average Tx energy (i.e., EPRE) for each RE of each antenna port may be denoted by $E_t=T \cdot P_a/K$. K subcarriers may be amplified and transmitted by a single amplifier, such that Tx power can be easily exchanged between the subcarriers. That is, the entire Tx energy of K subcarriers at the same OFDM symbol need not exceed the energy denoted by $K \cdot E_a$.

For transmission of data having R Tx data layers, the Tx data symbol vector may be transmitted through each of the $N_t$ antennas through precoding as denoted by the following equation 2. In order to implement Tx power denoted by the maximum power ($P_t$), the precoding matrix (W) may allow the respective elements to have the same size (i.e., $|w_{i,j}|^2=1/R$). The number (R) of data layers simultaneously transmitted may be referred to as the number of streams or the number of ranks.

$$x = \sqrt{E_a}\, Ws = \sqrt{E_a} \begin{bmatrix} w_{0,0} & w_{0,1} & \cdots & w_{0,R-1} \\ w_{1,0} & w_{1,1} & \cdots & w_{1,R-1} \\ \vdots & \vdots & \ddots & \vdots \\ w_{N_t-1,0} & w_{N_t-1,1} & \cdots & w_{N_t-1,R-1} \end{bmatrix} \begin{bmatrix} s_0 \\ s_1 \\ \vdots \\ s_{R-1} \end{bmatrix}. \quad \text{[Equation 1]}$$

The Tx signal of Equation 1 may be received by the receiver having $N_r$ Rx antennas after passing through the channel, and the received signal may be denoted by the following equation 2. In Equation 2, H may be a ($N_r \times N_t$) channel matrix, and n may be an ($N_r \times 1$) noise vector.

$$y=Hx+n=\sqrt{E_a}HWs+n. \quad \text{[Equation 2]}$$

For data demodulation, the effective channel (H·W) must be recognized, and a method for directly estimating the effective channel through DM-RS transmission may also be possible. However, the channel matrix (H) must be estimated to determine the precoding matrix (W) for maximizing Tx efficiency.

$$H=[h_0\ h_1\ \ldots\ h_{N_t-1}] \quad \text{[Equation 3]}$$

In Equation 3, the effective channel matrix H may be represented by $N_t$ channel column vectors. $h_n$ may denote a channel between the n-th Tx antenna port and the $N_r$ Rx antennas. During estimation of the channel matrix, an independent RS is transmitted at each antenna port such that each channel vector $h_n$ may be independently estimated. For channel estimation accuracy, RS for each antenna port must be transmitted through orthogonal resources. That is, in order to transmit the RS for the 0-th antenna port as denoted by Equation 1, the precoding matrix is a column vector having "Rank=1", such that all elements other than the first element must be zero (i.e., $|w_i|^2=0_i$, (i≠0)). In this case, the first element ($w_0$) may have the magnitude denoted by $\sqrt{N_t}$. Since the data symbol is transmitted with energy ($N_t \cdot E_a$), the data symbol must be transmitted with the same Tx energy such that it has the same cell coverage.

Figure 10:
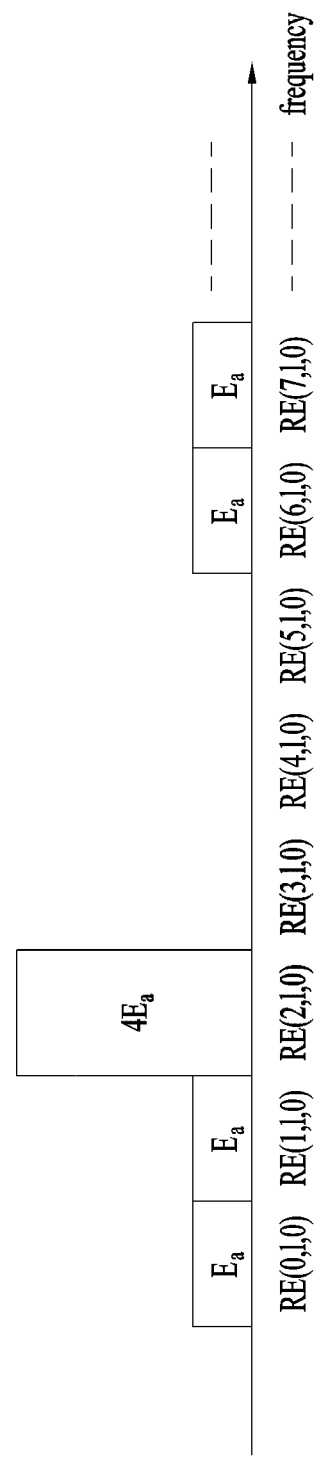
FIG. 10 is a conceptual diagram illustrating an Energy Per Resource Element (EPRE) of a specific antenna port.

In accordance with the scheme for FDM-processing the RS for the $N_t$ antenna ports and transmitting the FDM-processed RS, when RS of the $n_i$-th port is transmitted at RE($k_i$,l,$n_i$) and RS of the $n_j$-th port is transmitted at RE($k_j$,l,$n_j$), no signal is transmitted to RE($k_i$,l,$n_j$) and RE($k_j$,l,$n_i$), such that RS Tx power may increase at RE($k_i$,l,$n_i$) and RE($k_j$,l,$n_j$). The reason why the above-mentioned operations are performed is that Tx power can be exchanged between the subcarriers. FIG. 10 is a conceptual diagram illustrating an exemplary EPRE transmitted to RE of the 0-th antenna port according to the scheme for transmitting the RS of the n-th antenna port to the subcarrier corresponding to k=2+n at $N_t$=4. The muting operation in which no signal is transmitted to prevent occurrence of RS interference transmitted from the other port in the 0-th antenna port at the RE having "k=3, 4, 5" is performed, such that energy transmittable at the corresponding RE may be transferred to RE(2,1,0) to which RS of the 0-th antenna port is transmitted, and the resultant energy is then transmitted. In FIG. 10, the data symbol is transmitted to RE having (k=0, 1, 6, 7), and the exemplary EPRE having the data symbol is shown. From the viewpoint of EPRE per antenna, whereas EPRE of the RS transmission RE is larger than EPRE of the data transmission RE by a predetermined size corresponding to $N_t$ times, the RS Tx energy may be identical to the data Tx energy from the viewpoint of energy of the sum of Tx energy of all antennas.

In order to measure the channel of the entire band in the frequency selective fading environment, RS may be repeatedly transmitted on the frequency domain at intervals of a predetermined time. RS must be transmitted at least one time at intervals of a channel coherence bandwidth ($BW_c$), such that the spacing of subcarriers to which the RS of the same antenna port is transmitted must be smaller than $T \cdot BW_c$. Assuming that a total number ($N_t$) of antennas is higher than $T \cdot BW_c$, it is impossible for all RSs for each of the $N_t$ antenna ports to be transmitted according to the FDM scheme. Therefore, the TDM or CDM scheme must be additionally considered to transmit a large number of RSs.

Figure 11:
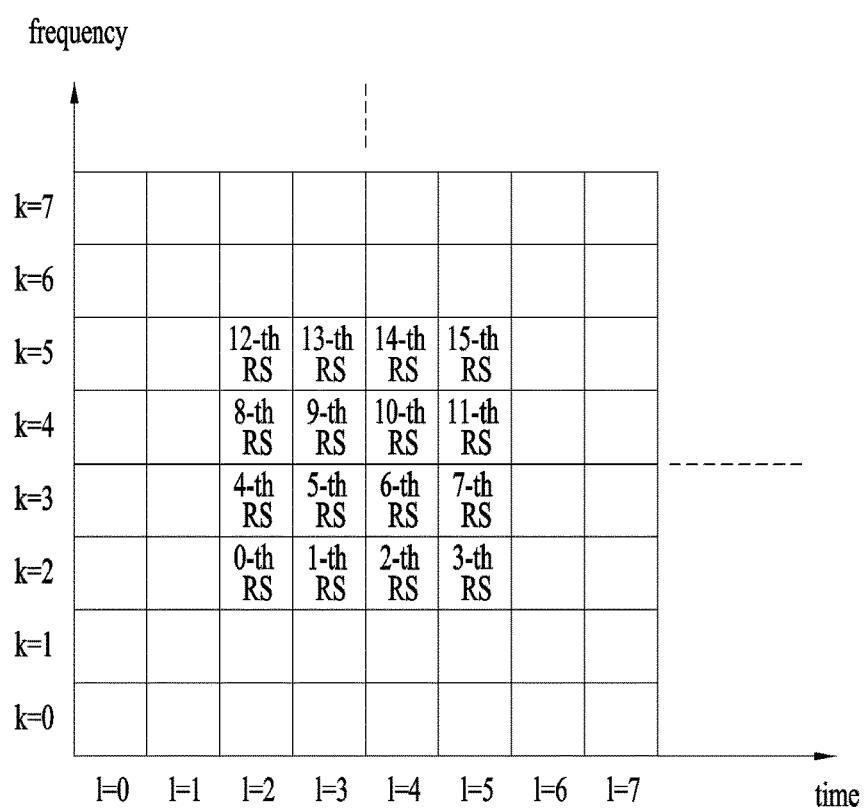
FIG. 11 is a conceptual diagram illustrating a reference signal (RS) pattern based on the FDM+TDM scheme.

The FDM+TDM scheme may combine $M_f$ resources of the frequency domain with $M_t$ resources of the time domain, and may transmit $N_t$ RSs using $N_t = M_f \cdot M_t$ REs. FIG. 11 is a conceptual diagram of the FDM+TDM scheme, and may transmit 16 RSs to a total of 16 REs using 4 subcarriers and 4 OFDM symbols on the OFDM resource grid. The 0-th antenna port may transmit the RS to RE(2,2,0), and may perform muting at RE to which RS of the other antenna port is transmitted. Since Tx power can be exchanged between the subcarriers, Tx energy at RE(k,2,0) (where k=3, 4, 5) can be applied to RE(2,2,0). If Tx energy is transmitted at different times, Tx energy cannot be exchanged, such that it is impossible for the Tx energy at RE(k,l,0)(where k=2, . . . , 5, l=3, 4, 5) to be applied to RE(k,2,0). In conclusion, whereas the data symbol is transmitted with energy ($N_t \cdot E_a$), RS may be transmitted with energy ($M_f \cdot E_a$) only.

Figure 12:
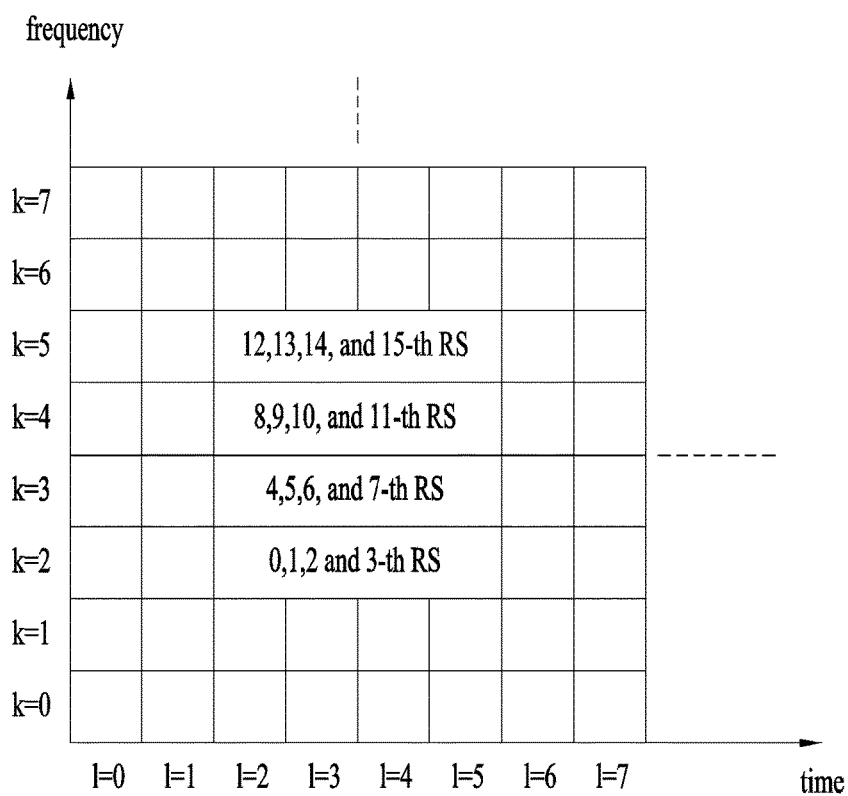
FIG. 12 is a conceptual diagram illustrating a reference signal (RS) pattern based on the FDM+CDM scheme.

The FDM+CDM scheme may combine $M_f$ resources of the frequency domain with $M_t$ resources of the time domain, and may transmit $N_t$ RSs using $N_t = M_f \cdot M_t$ REs. A specific antenna port may be used to transmit data using all the $M_t$ resources of a specific subcarrier. Here, $M_t$ antenna ports may be simultaneously transmitted to $M_t$ resources of the specific subcarrier according to the CDM scheme. FIG. 12 is a conceptual diagram illustrating the FDM+CDM scheme in which 16 RSs are transmitted to a total of 16 REs using 4 subcarriers and 4 OFDM symbols on the OFDM resource grid. In this case, RSs of the antenna port may be CDM-processed and transmitted to resources RE(2,l,n) (where l=2, 3, 4, 5). That is, RSs of the n-th port (where n=0, 1, 2, 3) transmitted at RE(2,l,n) (where, l=2, 3, 4, 5) may be multiplied by a coefficient of c(n,l−2), such that the multiplied result is then transmitted. In order to remove mutual interference between CDM-processed RSs, the $M_t$-length coefficient sequences c(n,j) (where j=0, . . . , $M_t$−1) multiplied by the other antenna port must be orthogonal to each other. In other words, the coefficient sequence must satisfy the following equation 4.

$$\sum_{j=0}^{M_t-1} c(n_1, j)c(n_2, j) = \begin{cases} M_t, & n_1 = n_2 \\ 0, & n_1 \neq n_2 \end{cases}. \quad \text{[Equation 4]}$$

According to the FDM+CDM scheme, whereas RS is transmitted with energy ($M_f \cdot E_a$) at only one oFDM symbol, the RS may be transmitted at $M_t$ OFDM symbols, such that total transmission energy may be denoted by $N_t \cdot E_a$.

In order to prevent interference between the CDM-processed RSs based on the FDM+CDM scheme from occurring in the receiver, the receiver must allow $M_t$ OFDM symbols to undergo the same fading on the time domain. That is, the Tx time ($T \cdot M_t$) of the CDM-processed RS must be greatly shorter than a coherence time of the channel Assuming that an effective channel response is not maintained during a predetermined time corresponding to $M_t$ OFDM symbols due to time-variant fading characteristics or other reasons, interference between the CDM-processed RS signals occurs in the receiver, such that the channel estimation accuracy of each RS may be abruptly reduced.

In addition, although channel variation caused by the fading phenomenon does not occur, after lapse of a predetermined time according to a difference between the Tx frequency generated by the oscillator of the transmitter and the Rx frequency generated by the oscillator of the receiver, a baseband signal phase of the Rx signal is changed in the receiver. That is, when the frequency of the receiver is set to $\omega_0 + \Delta$ by such difference whereas the Tx frequency is set to $\omega_0$, the signal Rx phase may be changed by a predetermined value $\exp(j2\pi\Delta t)$ according to lapse of a time. In this case, assuming that the receiver detects the CDM-processed RS signal without recognizing the above-mentioned situation, interference between RSs may occur.

In the legacy LTE system, in order to design an RS having the (FDM+CDM)—based Tx resource pattern of FIG. 12 as well as to additionally transmit the designed RS, $M_t$ contiguous OFDM symbols must be utilized only for the corresponding RS Tx resource. However, from the viewpoint of Tx RE patterns of the legacy signals of the LTE system shown in FIG. 7, it is difficult for contiguous OFDM symbols to be allocated to new RS transmission due to CRS and DM-RS transmission per subframe. Therefore, the other case in which $M_t$ OFDM symbols may not be successively arranged must be considered.

[RS transmission Precoding Based on CDM—Based RS Transmission]

A coefficient sequence c(n,j) multiplied by the CDM-processed RS based on the FDM+CDM scheme may be represented by a matrix shown in the following equation 5.

$$C = [c(n, j)] = \begin{bmatrix} c^{(0)} \\ c^{(1)} \\ \vdots \\ c^{(M_t-1)} \end{bmatrix} = [b(0) \quad b(1) \quad \ldots \quad b(M_t-1)] \quad \text{[Equation 5]}$$

In Equation 5, assuming that a column is denoted by $M_t$ row vectors, the n-th row vector ($c^{(n)}$) may denote the coefficient sequence multiplied by the RS sequence of the n-th antenna port. If the matrix C is denoted by $M_t$ column vectors, the j-th column vector b(j) is a vector used for RS transmission at the j-th OFDM symbol to be transmitted by the CDM-processed RS, and may denote the precoding vector for RS transmission.

If RSs of the (n=0, . . . , $M_t$−1)-th antenna ports are CDM-processed and transmitted according to the FDM+CDM scheme, the Tx signal for the CDM-processed j-th RE may be denoted by the following equation 6.

$$x_{RS}(j) = \sqrt{M_f E_a} W_{RS}(j) s_{RS}(j). \quad \text{[Equation 6]}$$

In Equation 6, $S_{RS}(j)$ may denote the RS sequence, $W_{RS}(j)$ may indicate the precoding vector applied to the RS as represented by the following equation 7, and $0^{(M \times N)}$ may denote the M×N zero matrix.

$$W_{RS}(j) = \begin{bmatrix} c(0, j) \\ \vdots \\ c(M_t - 1, j) \\ 0 \\ \vdots \end{bmatrix} = \begin{bmatrix} b(j) \\ 0^{(M_t \times 1)} \\ \vdots \\ 0^{(M_t \times 1)} \end{bmatrix}. \quad \text{[Equation 7]}$$

As can be seen from Equation 1, in order to transmit data at the highest power ($P_t$) using the precoding matrix $W_D$ used for data transmission, it may be desirable that each element is not zero (non-zero) and has the same size (i.e., $|w_{i,j}|^2 = 1/R$). However, according to the precoding vector $W_{RS}(j)$ used in RS transmission, only the corresponding elements of the CDM-processed antenna ports are not zero (non-zero). That is, whereas the data precoding matrix uses all the antenna ports, the precoding vector used for RS according to the FDM+CDM RS transmission scheme may use only the CDM-processed antenna ports.

The Rx signal acquired after the CDM-processed RS of FIG. 6 passes through the channel may be represented by the following equation 8.

$$y_{RS}(j) = H x_{RS}(j) + n \quad \text{[Equation 8]}$$

$$= \sqrt{M_f \cdot E_a} \begin{bmatrix} h_0^{(N_r \times M_t)} & h_1^{(N_r \times M_t)} & \cdots & h_{M_f-1}^{(N_r \times M_t)} \end{bmatrix} \begin{bmatrix} b(j) \\ 0^{(M_t \times 1)} \\ \vdots \\ 0^{(M_t \times 1)} \end{bmatrix} s_{RS}(j) + n$$

$$= \sqrt{M_f \cdot E_a} \, h_0^{(N_r \times M_t)} b(j) s_{RS}(j) + n.$$

In Equation 8, $h_0^{(N_r \times M_t)}$ may denote the $N_r \times M_t$ matrix indicating the partial channel response from the m-th CDM-processed antenna port group to the Rx antenna.

The entire CDM-processed Rx signal sequence having the length of $M_t$ may be represented by the following equation 9. Thereafter, the Hermitian matrix $(C \cdot S_{RS})$ is multiplied by the entire Rx signal sequence such that an independent partial channel response $h_0^{(N_r \times M_t)}$ can be acquired.

$$Y_{RS} = [y_{RS}(0) \ y_{RS}(1) \ \ldots \ y_{RS}(M_t - 1)] \quad \text{[Equation 9]}$$

$$= \sqrt{M_f \cdot E_a} \, h_0^{(N_r \times M_t)} [b(0) \ b(1) \ \ldots \ b(M_t - 1)] S_{RS} + \eta$$

$$= \sqrt{M_f \cdot E_a} \, h_0^{(N_r \times M_t)} C S_{RS} + \eta,$$

where $\ldots S_{RS} = \begin{bmatrix} s_{RS}(0) & 0 & \cdots & 0 \\ 0 & s_{RS}(1) & \cdots & 0 \\ \vdots & \vdots & \ddots & \vdots \\ 0 & 0 & \cdots & s_{RS}(M_t - 1) \end{bmatrix}.$ $$Y_{RS} \cdot (C \cdot S_{RS})^H = \sqrt{M_f \cdot E_a} \, h_0^{(N_r \times M_t)} C^H S_{RS} (C \cdot S_{RS})^H + \quad \text{[Equation 10]}$$

$$\eta (C \cdot S_{RS})^H$$

$$= \sqrt{M_f M_t \cdot E_a} \, h_0^{(N_r \times M_t)} + \eta (C \cdot S_{RS})^H.$$

Equation 9 has disclosed the example in which the channel response is fixed during transmission of $M_t$ CDM-processed OFDM symbols. However, assuming that a channel response is not maintained, Equation 9 may be modified as shown in the following equation 11.

$$Y_{RS} = [y_{RS}(0) \ y_{RS}(1) \ \ldots \ y_{RS}(M_t - 1)] \quad \text{[Equation 11]}$$

$$= \sqrt{M_f \cdot E_a} \left[ h_0^{(N_r \times M_t)}(0) \cdot b(0) \ \ldots \ h_0^{(N_r \times M_t)}(M_t - 1) \cdot b(M_t - 1) \right] S_{RS} + \eta.$$

In Equation 11, $h_0^{(N_r \times M_t)}(j)$ may denote the partial channel response of a channel at the j-th OFDM symbol to be transmitted by the CDM-processed RS. If the channel response is changed, it is difficult to directly measure $h_0^{(N_r \times M_t)}(j)$, and only the effective channel $h_0^{(N_r \times M_t)}(j) \cdot b(j)$ modified by the RS precoding vector b(j) can be recognized.

[Data Precoding Matrix and Codebook]

$M_t$ antenna ports transmitted the CDM-processed RS are grouped, and the grouped result will hereinafter be referred to as an antenna port group. Considering the antenna port index of FIG. 12, the antenna ports ranging from the f·$M_t$-th antenna port to the ((f+1)·$M_t$−1)-th antenna port will hereinafter be referred to as the f-th antenna group.

The precoding matrix used in data transmission may be represented by the sub-precoding matrix applied to the antenna group as shown in the following equation 12. In Equation 12, $W_{D,f}$ is an ($M_t \times R$) vector, and may denote the sub-precoding matrix applied to the f-th antenna group.

$$W_D = \begin{bmatrix} W_{D,0} \\ W_{D,1} \\ \vdots \\ W_{D,M_f-1} \end{bmatrix}. \quad \text{[Equation 12]}$$

The precoding matrix used in data transmission or CSI report may be selected from the set composed of a restricted number of matrices called a codebook, and then used. That is, assuming that the codebook $CB(N_t)$ for $N_t$ Tx antennas is given, $W_D \in CB(N_t)$ must be satisfied. The above-mentioned codebook concept may be applied to the sub-precoding matrix applied to the antenna group. When the codebook $CB_f(M_t)$ for $M_t$ antennas for the f-th antenna group is given, $W_{D,f} \in CB_f(M_t)$ must be satisfied.

[The Relationship Between the RS Precoding Vector and the Data Codebook]

In accordance with the embodiment of the present invention, vectors generated by a linear combination of RS precoding vectors decided by an orthogonal sequence multiplied by RSs which are CDM-processed and transmitted when RSs of several antenna ports are transmitted according to the FDM+CDM scheme, can be contained in a codebook for the precoding matrix used in data transmission or CSI report. In other words, the present invention may provide a method for maximizing the ratio of the data precoding matrices contained in the codebook represented by a linear combination of the RS precoding vectors. Even when the channel response from each antenna port is inaccurately recognized through the CDM-processed RS according to time-variant characteristics of the channel and only the effective channel modified by the RS precoding vector can be confirmed, the matrices capable of being represented by linear combination of the RS precoding vectors from among the precoding matrices of the codebook can be maximally utilized to increase Tx capacity.

The set of matrices capable of being represented by a linear combination of the RS precoding vectors using all the column vectors constructing each matrix from among the precoding matrices contained in the codebook may be defined as a first subcodebook (Subcodebook 1), and the set of the remaining matrices may be defined as a second subcodebook (Subcodebook 2). In accordance with the proposed scheme, assuming that the UE can correctly recognize the channel response from each antenna port through the CDM-processed RS having low channel time-variance characteristics, al the precoding matrices contained in the entire codebook can be used as the candidate matrices during CSR report. However, assuming that the channel has high time-variance characteristics, only the precoding matrices contained in the subcodebook 1 may be considered to be the candidate matrices during the CSI report.

Assuming that the precoding vector for RS transmission applied to the j-th OFDM symbol for the f-th antenna group is defined as bf(j) as denoted by Equation 5, $b_j(f) \in CB_j(M_t)$ must be achieved such that bf(j) belongs to CBf(Mt) according to the proposed scheme of the present invention. In addition, the vector denoted by a linear combination of the RS precoding vectors applied to each antenna group at the j-th OFDM symbol may belong to CB(Nt) within the maximum range. The RS precoding vector applied to the f-th antenna group at the j-th OFDM symbol may be represented by the following equation 13.

$$W_{RS,f}(j) = \begin{bmatrix} \vdots \\ 0^{(M_t \times 1)} \\ b_f(j) \\ 0^{(M_t \times 1)} \\ \vdots \end{bmatrix}.$$ [Equation 13]

Linear combination of the RS precoding vectors applied to each antenna group at the j-th OFDM symbol using the above-mentioned result may be represented by the following equation 14.

$$\sum_{f=0}^{M_f-1} \beta_f W_{RS,f}(j) = \begin{bmatrix} \beta_0 b_0(j) \\ \beta_1 b_1(j) \\ \vdots \\ \beta_{M_f-1} b_{M_f-1}(j) \end{bmatrix}.$$ [Equation 14]

In addition, assuming that all the column vectors constructing the matrix having Rank=R are composed of a linear combination of the RS precoding vectors, the resultant vectors may be represented by the following equation 15.

$$\begin{bmatrix} \beta_{0,0} b_0(j) & \beta_{0,1} b_0(j) & \cdots & \beta_{0,R-1} b_0(j) \\ \beta_{1,0} b_1(j) & \beta_{1,1} b_1(j) & \cdots & \beta_{1,R-1} b_1(j) \\ \vdots & \vdots & \ddots & \vdots \\ \beta_{M_f-1,0} b_{M_f-1}(j) & \beta_{M_f-1,1} b_{M_f-1}(j) & \cdots & \beta_{M_f-1,R-1} b_{M_f-1}(j) \end{bmatrix}$$ [Equation 15]

In accordance with the proposed concept of the present invention, the set of matrices capable of being denoted by Equation 14 or 15 from among the precoding matrices contained in the codebook may be defined as a first subcodebook (Subcodebook 1), such that the subcodebook 1 from among a predetermined-sized codebook may be designed to have the maximum size thereof.

The UE may estimate the Rx quality when the corresponding precoding matrix is applied to each precoding matrix contained in the codebook after completion of channel measurement, such that the UE may perform CSI report regarding the selected precoding matrix having optimum performance and the corresponding channel quality.

If the channel has low time-variance characteristics, the channel $h_n^{(N_t \times 1)}$ from the n-th Tx antenna port may be measured through the (FDM+CDM)-processed RS, such that the Rx quality of all the precoding matrices contained in the codebook can be estimated. However, assuming that the channel has high time-variance characteristics, only the effective channel $h_f^{(N_r \times M_t)} \cdot b(j)$ from the f-th antenna group can be measured. In this case, the Rx quality of the precoding matrices contained in the subcodebook 1 may be estimated such that the precoding matrix needed for the report may be selected according to the estimation result.

Assuming that time-variance characteristics of the channel are maintained at the j-th OFDM symbol and the (j+ε)-th OFDM symbol, Equation 15 is modified as follows, such that the set of matrices capable of being denoted by the following equation 16 from among the precoding matrices contained in the codebook may be defined as the subcodebook 1 (Subcodebook 1).

[Equation 16]

$$\begin{bmatrix} \beta_{0,0}b_0(j+\varepsilon_{0,0}) & \beta_{0,1}b_0(j+\varepsilon_{0,1}) & \cdots & \beta_{0,R-1}b_0(j+\varepsilon_{0,R-1}) \\ \beta_{1,0}b_1(j+\varepsilon_{1,0}) & \beta_{1,1}b_1(j+\varepsilon_{1,1}) & \cdots & \beta_{1,R-1}b_1(j+\varepsilon_{1,R-1}) \\ \vdots & \vdots & \ddots & \vdots \\ \beta_{M_f-1,0}b_{M_f-1}(j+\varepsilon_{M_f-1,0}) & \beta_{M_f-1,1}b_{M_f-1}(j+\varepsilon_{M_f-1,1}) & \cdots & \beta_{M_f-1,R-1}b_{M_f-1}(j+\varepsilon_{M_f-1,R-1}) \end{bmatrix}$$

[Application to 2D AAS]

This paragraph will disclose an example in which the inventive concept is applied to 2D AAS of FIG. 12. In 2D AAS, the group of the antenna ports to be transmitted by the CDM-processed RS may be applied to the group composed of the horizontal directional antenna rows or to the other group composed of the vertical directional antenna columns. In the former case (FIG. 13a), the number of OFDM symbols needed for RS transmission is set to $M_t = N_h$, and the number of subcarriers needed for RS transmission is set to $M_f = N_v$. In the latter case (FIG. 13b), $M_t = N_v$ and $M_f = N_h$ may be established.

Figure 13:
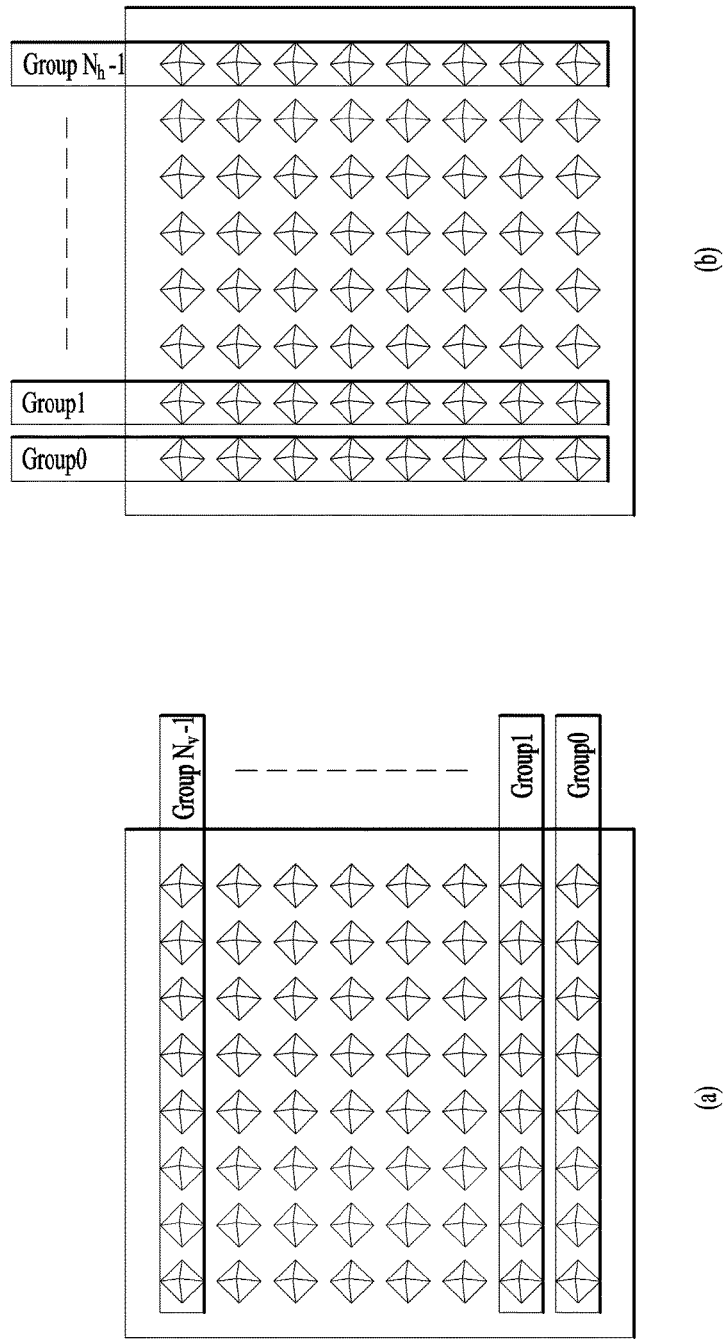
FIG. 13 is a conceptual diagram illustrating a two-dimensional (2D) antenna array including a plurality of groups.

In 2D AAS, as the spacing between the antenna elements is reduced, the 3D beam shape may be denoted by the product of the horizontal beam and the vertical beam. Therefore, the codebook denoted by the Kronecker product between the horizontal antenna precoding matrix $W_D^{(H)}$ and the vertical antenna precoding matrix $W_D^{(V)}$ may be considered to be the codebook to be used in 2D AAS. By the indexing order of the antenna ports, the example of FIG. 13(a) is denoted by the following equation 17, and the Kronecker product is denoted by the following equation 18 as shown in FIG. 13(b).

$$W_D = W_D^{(V)} \otimes W_D^{(H)} \qquad \text{[Equation 17]}$$

$$W_D = W_D^{(H)} \otimes W_D^{(V)} \qquad \text{[Equation 18]}$$

The set of the horizontal antenna precoding matrices is defined as the codebook $CB^{(H)}(N_h)$ of the horizontal antenna, and the set of the vertical antenna precoding matrices is defined as the codebook $CB^{(V)}(N_v)$ of the vertical antenna.

If the proposed concept of the present invention is applied to the example of FIG. 13(a), the RS precoding vector $b_j(j)$ of the antenna port group may belong to the horizontal antenna codebook. In contrast, if the proposed concept of the present invention is applied to the example of FIG. 13(b), the RS precoding vector may belong to the vertical antenna codebook.

In addition, when using the codebook constructed by the DFT extension matrices according to the horizontal antenna codebook or the vertical antenna codebook for use in 2D AAS, a DFT vector may be used as the RS precoding vector. A transpose matrix of the DFT matrix may also be the DFT matrix, such that the DFT sequence may be used as the orthogonal sequence of the CDM-processed RS.

The DFT extension matrix having N antenna ports and the bit size of F may be defined and oversampled as the $N \times 2^F$ matrix, and may include N initial rows of the $(2^F \times 2^F)$ DFT matrix. The codebook composed of the DFT extension matrix may be a codebook composed of the column vectors of the DFT extension matrix. The column vectors of the N×N DFT matrix may be contained as the column vector of the $N \times 2^F$ DFT extension matrix. In this case, according to the proposed scheme of the present invention, the row vector of the N×N DFT matrix may be used as the orthogonal sequence of the CDM-processed RS. The set of the preceding matrices denoted by column vectors of the N×N DFT matrix from among the precoding matrices contained in the codebook may be defined as the subcodebook 1. If the channel has high time-variance characteristics, the UE may consider only the precoding matrices contained in the subcodebook 1 to be the candidate matrix during CSI report. That is, assuming that the channel has high time-variance characteristics, a predetermined codebook subset restriction is applied so that the UE may consider only some of the precoding matrices to be the precoding candidate matrices during CSI report.

Figure 14:
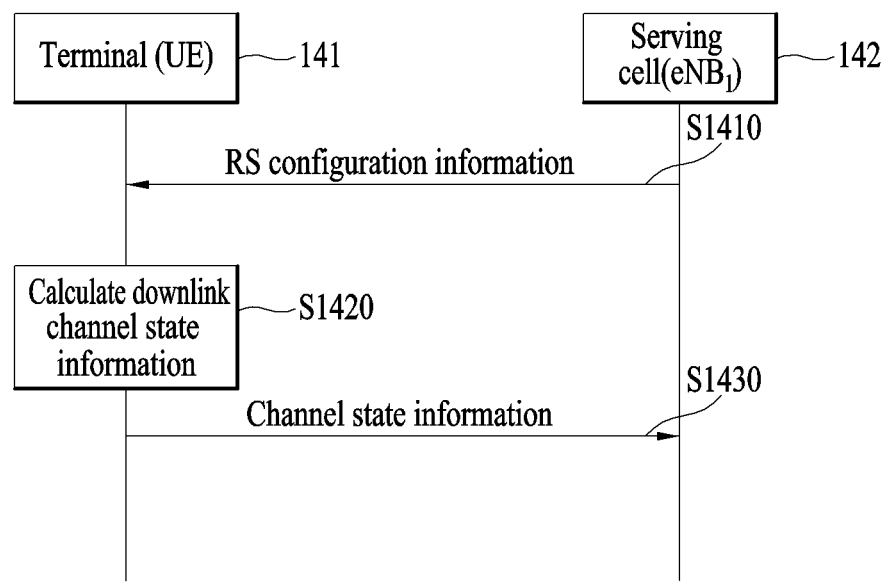
FIG. 14 is a flowchart illustrating the operations of the embodiment.

FIG. 14 is a flowchart illustrating the operations of the embodiment.

Referring to FIG. 14, the UE 141 may report channel state information (CSI) regarding a downlink channel transmitted through $N_t$ antenna ports arranged in a 2D array. That is, the serving cell 142 may include $N_t$ 2D antenna ports, and may transmit a downlink signal through the $N_t$ antenna ports.

The UE may receive a reference signal (RS) configuration for channel measurement of the $N_t$ 2D antenna ports (S1410). The RS may be CDM-processed such that the CDM-processed RS may be transmitted through $N_t$ antenna ports. The UE may receive the RS using the received RS configuration, may calculate CSI of the downlink channel, and may report the calculated CSI to the serving cell (S1420). The reported CSI may include the precoding matrix for RS transmission, and the precoding matrix for RS transmission may be a subset of the codebook of the precoding matrices needed to transmit data of the $N_t$ antenna ports.

The $N_t$ antenna ports may be comprised of the vertical antenna group or the horizontal antenna group. In addition, the codebook for the precoding matrix needed to transmit data of the $N_t$ antenna ports may be represented by the Kronecker product of the precoding matrices of the vertical antenna group of the $N_t$ antenna ports and the precoding matrices of the horizontal antenna group of the $N_t$ antenna ports. In addition, assuming that the degree of time-variance characteristics of the downlink channel is less than a predetermined value, all the codebooks for the precoding matrix for data transmission of the $N_t$ antenna ports may be considered to be the candidate matrices for CSI report. Alternatively, assuming that the degree of time-variance characteristics of the downlink channel is equal to or higher than a predetermined value, the precoding matrices for RS transmission may be considered to be the candidate matrices for CSI report.

UE or BS operations of FIG. 14 may include not only the above-mentioned embodiment, but also at least one of the detailed embodiments of the present invention.

Figure 15:
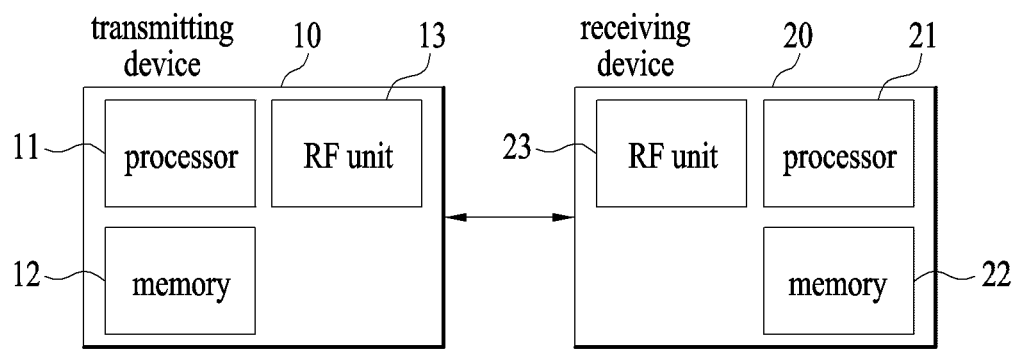
FIG. 15 is a block diagram illustrating an apparatus for implementing embodiment(s) of the present invention.

FIG. 15 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a UE, a relay, and a BS.

The invention claimed is:

1. A method for reporting, by a terminal, a channel state for a downlink channel transmitted through Nt antenna ports arranged in a two dimensional (2D) shape, the method comprising:

Receiving a reference signal (RS) configuration for channel measurement of the Nt antenna ports arranged in the 2D shape, wherein an RS is code division multiplexed (CDM) and then received through the Nt antenna ports;

calculating channel state information (CSI) of the downlink channel based on the RS related to the RS configuration; and reporting the calculated CSI to a serving cell, wherein the calculated CSI includes a precoding matrix consisting of vectors generated by a linear combination of RS precoding vectors determined by an orthogonal sequence for the RS related to the RS configuration, wherein the precoding matrix is a subset of a precoding matrix codebook for data transmission of the Nt antenna ports, wherein, when time variance of the downlink channel is lower than a predefined value, all of precoding matrices included in the precoding matrix codebook for data transmission of the $N_t$ antenna ports are used as candidate matrices for reporting the channel state, and wherein, when time variance of the downlink channel is equal to or greater than the predefined value, a set of precoding matrices consisting of vectors generated by a linear combination of the RS precoding vectors is used as candidate matrices for reporting the channel state.

2. The method according to claim 1, wherein the Nt antenna ports are comprised of a vertical antenna group or a horizontal antenna group.

3. The method according to claim 1, wherein the precoding matrix codebook for data transmission of the Nt antenna ports is represented by a Kronecker product of a precoding matrix of a vertical antenna group and a precoding matrix of a horizontal antenna group of the Nt antenna ports.

4. A terminal for reporting a channel state for a downlink channel transmitted through Nt antenna ports arranged in a two dimensional (2D) shape, the terminal comprising:
　a transceiver; and
　a processor that controls the transceiver,
　wherein the processor:
　　controls the transceiver to receive a reference signal (RS) configuration for channel measurement of the Nt antenna ports arranged in the 2D shape, wherein an RS is code division multiplexed and then received through the Nt antenna ports,
　　calculates channel state information (CSI) of the downlink channel based on the RS related to the RS configuration, and
　　controls the transceiver to report the calculated CSI to a serving cell,
　wherein the calculated CSI includes a precoding matrix consisting of vectors generated by a linear combination of RS precoding vectors determined by an orthogonal sequence for the RS related to the RS configuration,
　wherein the precoding matrix is a subset of a precoding matrix codebook for data transmission of the Nt antenna ports,
　wherein, when time variance of the downlink channel is lower than a predefined value, all of precoding matrices included in the precoding matrix codebook for data transmission of the $N_t$ antenna ports are used as candidate matrices for reporting the channel state, and
　wherein, when time variance of the downlink channel is equal to or greater than the predefined value, a set of precoding matrices consisting of vectors generated by a linear combination of the RS precoding vectors is used as candidate matrices for reporting the channel state.

5. The terminal according to claim 4, wherein the Nt antenna ports are comprised of a vertical antenna group or a horizontal antenna group.

6. The terminal according to claim 4, wherein the precoding matrix codebook for data transmission of the Nt antenna ports is represented by a Kronecker product of a precoding matrix of a vertical antenna group and a precoding matrix of a horizontal antenna group of the Nt antenna ports.

* * * * *